United States Patent [19]

Uematsu et al.

[11] Patent Number: 4,523,668
[45] Date of Patent: Jun. 18, 1985

[54] POWER CONTROLLING APPARATUS USING FRICTION MATERIAL

[75] Inventors: Takao Uematsu; Yoshiharu Honma; Seikichi Tanno; Ran Ito, all of Hitachi; Jun Matsubayashi, Ibaraki; Tomio Yoshida, Takahagi, all of Japan

[73] Assignee: Hitachi, Ltd., Tokyo, Japan

[21] Appl. No.: 405,284

[22] Filed: Aug. 4, 1982

[30] Foreign Application Priority Data

Aug. 10, 1981 [JP] Japan ................... 56-124065

[51] Int. Cl.³ .................. F16D 69/02; F16D 13/74
[52] U.S. Cl. ................... 192/107 M; 106/36; 188/251 A; 192/113 R
[58] Field of Search ........... 192/107 M, 70.14, 113 R; 188/251 A, 218 XL; 106/36

[56] References Cited

U.S. PATENT DOCUMENTS

| | | | |
|---|---|---|---|
| 1,293,107 | 2/1919 | Johnson | 106/36 |
| 1,301,612 | 4/1919 | Simpson | 106/36 |
| 2,054,210 | 9/1936 | Weisenburg | 106/36 |
| 2,284,785 | 6/1942 | Wilkey | 106/36 |
| 2,818,634 | 1/1958 | Batchelor et al. | 106/36 X |
| 2,899,740 | 8/1959 | Cox | 106/36 |
| 3,143,895 | 8/1964 | Robie | 192/107 M X |
| 3,684,062 | 8/1972 | Johnson | 188/251 A X |

FOREIGN PATENT DOCUMENTS

| | | | |
|---|---|---|---|
| 2112357 | 9/1972 | Fed. Rep. of Germany ... | 188/251 A |
| 2646843 | 4/1978 | Fed. Rep. of Germany ... | 192/107 M |
| 127956 | 11/1978 | Japan | 192/107 M |
| 127955 | 11/1978 | Japan | 192/107 M |
| 4940 | 1/1979 | Japan | 106/36 |
| 123650 | 9/1979 | Japan | 192/107 M |
| 362867 | 6/1930 | United Kingdom | 106/36 |

Primary Examiner—Rodney H. Bonck
Attorney, Agent, or Firm—Antonelli, Terry & Wands

[57] ABSTRACT

A friction material made of a molded cork, a friction surface of which is covered with a liquid or semi-solid lubricant layer including a solid lubricant layer comprising a solid lubricant having a larger particle size and a solid lubricant having a smaller particle size and filling vacant spaces between the larger-sized solid lubricant in dense form, affords a long service life when used in a power controlling apparatus which can transmit power and/or change rotation speed by applying friction and using a friction material.

18 Claims, 7 Drawing Figures

POWER CONTROLLING APPARATUS USING FRICTION MATERIAL

BACKGROUND OF THE INVENTION

This invention relates to a cork friction material and a power controlling apparatus using such a friction material.

Cork is favorably used as friction material for various machine parts such as clutch facing in a motor control device or a power transmission apparatus in an electric-powered sewing machine, etc., for the reasons that cork has an optimal coefficient of friction for use as such friction material and that it substantially prevents creaky noise or odious smell from being produced by the friction surface in operation of the machine. However, there is a problem in the service life of cork because of its poor wear resistance. As an attempt for realizing longer life, Japanese Patent Appln. Kokai (Laid-Open) No. 4940/79 proposes coating of cork with a lubricating oil containing a solid lubricant. This cork friction material, however, is still unsatisfactory in life and further improvements are desired.

SUMMARY OF THE INVENTION

Objects of this invention are to provide a cork friction material with long service life and a power controlling apparatus using such a friction material.

The cork friction material provided according to this invention comprises a molded cork (or cork molding) having its friction surface covered with a liquid or semi-solid lubricant layer including a layer of solid lubricant particles which layer is composed of the particles with relatively large sizes and particles with relatively small sizes, the latter particles filling the vacant spaces formed by said particles of larger sizes, in dense form (preferably in closest packing).

BRIEF DESCRIPTION OF THE DRAWINGS

In the accompanying drawings.

DESCRIPTION OF THE PREFERRED EMBODIMENTS

The present invention is described in detail hereinbelow by way of the embodiments thereof with reference to the accompanying drawings. When the term "power controlling apparatus" is used in this specification, it refers to such apparatus which can transmit power and/or change rotation speed by applying friction.

Figure 1:
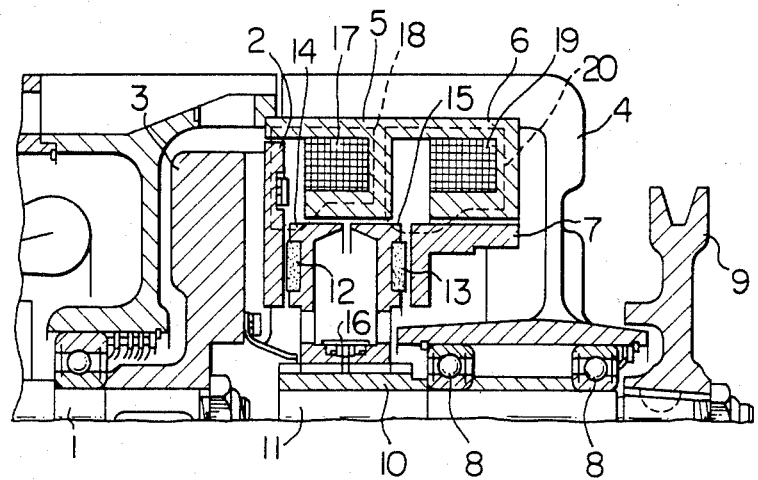
FIG. 1 is a partial sectional view of a motor having a clutch brake system according to the invention.
Figure 1A:
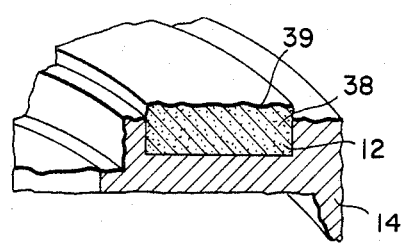
FIGS. 1a, 2a and 3a are enlarged cross-sectional views of the friction materials of the present invention when used in the apparatus of FIGS. 1, 2 and 3, respectively.
Figure 4:
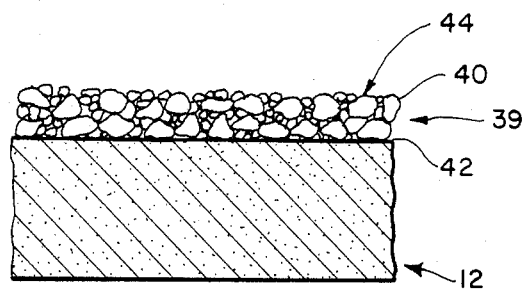
FIG. 4 is a schematic cross-sectional view of friction material according to the invention wherein solid lubricants having a larger particle size and those of smaller particle size are distributed on the surface of molded cork impregnated with a liquid lubricant.

Referring to FIG. 1, there is shown a partial sectional view of a motor with a clutch and brake system embodying a power controlling apparatus according to this invention. This driving motor comprises a rotor 1 to an end of which is mounted a fly-wheel 3 having secured thereto a clutch disc 2 which constitutes a part of the clutch assembly. Secured in position by an end bracket 4 on the pulley side are a clutch solenoid frame 5 having a clutch coil, a brake solenoid frame 6 having a brake coil and a brake disc 7. The end bracket 4 is also provided with a pulley 9 adapted for taking out the output through bearings 8 and supports at its other end an output shaft 11 having a shaft 10 (such as spline shaft). A clutch armature 14 carrying a clutch lining 12 and a brake armature 15 carrying a brake lining 13 are arranged for axial movement on the shaft 10 and joined to each other by a coupling 16 such that they are inhibited from making any relative movement in the rotating direction. When the motor is in operation, the rotor 1 keeps on rotating to accumulate the rotative energy on the fly-wheel 3 secured to the other end of said rotor, and thus when the clutch coil 17 is energized to form a clutch side magnetic circuit 19, the clutch armature 14 is magnetically attracted to the clutch disc 2 whereby the rotative force is transmitted through clutch lining 12, shaft 10 and output shaft 11 to the pulley 9 to provide a driving force. When stopping the motor, the brake coil 19 is energized to form a brake side magnetic circuit 20, whereby the brake armature 15 is attracted to the brake disc 7 to exercise a damping force by friction between the brake lining 13 and the brake disc 7 secured to the pulley side end bracket 4 to thereby stop the pulley 9. According to the present invention, a specific cork friction material is used for the clutch lining 12 and/or brake lining 13 in the power controlling apparatus. FIG. 1a shows a cork friction material of the invention as the lining 12 on clutch armature 14. The cork friction material is a molded cork material impregnated with a liquid lubricant 38 and having a lubricant layer 39 on its upper friction surface. As shown in FIG. 4, the lubricant layer 39 includes a solid lubricant having a larger particle size 40 and a solid lubricant having a smaller particle size 41 and filling vacant spaces between the larger-sized solid lubricant in dense form. A liquid or semi-solid lubricant of the lubricating layer is shown at 42.

Figure 2:
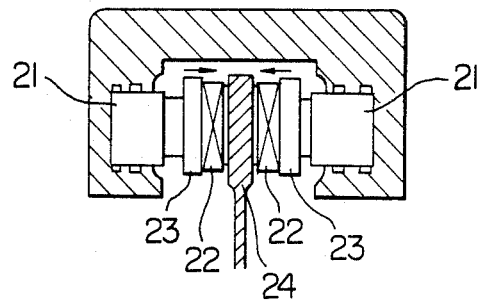
FIG. 2 is a sectional view of a disc brake, as another example of this invention.
Figure 2A:
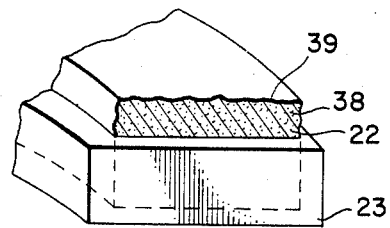

The specific cork friction material according to this invention can be used for various types of friction devices such as brakes and clutches. For instance, it can be employed as a friction material in a disc brake such as illustrated in FIG. 2, and FIG. 2a. In the disc brake system of FIG. 2, when an operating oil is introduced into the hydraulic cylinders 21, the cylinder heads 23 having a friction material 22 secured thereto are moved in the direction of arrows until the friction material 22 is brought into contact with the rotor plate 24 to stop its rotation.

Figure 3:
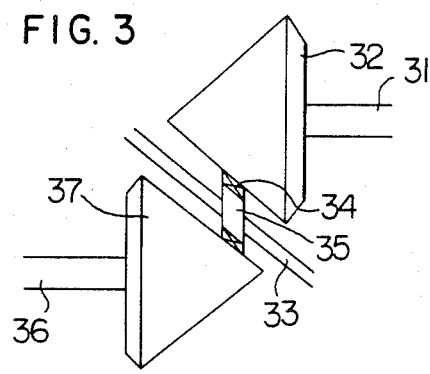
FIG. 3 is a diagrammatic illustration of the principal parts of a stepless speed change device, which is a further example of this invention.
Figure 3A:
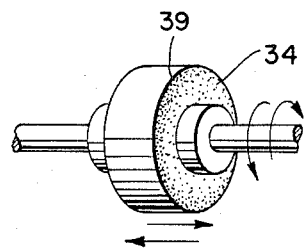

The specific cork friction material of this invention also finds its effective application in a stepless speed change device such as illustrated in FIG. 3 and FIG. 3a. Shown in FIG. 3 are the principal parts of a stepless speed change device of a roller system in which speed is changed by the action of two cone members with the aid of friction material. The rotating speed of the output shaft cone 32 secured to the output shaft 31 can be changed optionally by moving the roller plate 35 mounted on the roller drive shaft 33 and having a friction material 34 secured thereto in the axial direction of the roller drive shaft 33 between the output shaft cone 32 and the corresponding input shaft cone 37 secured to the input shaft 36 in opposed relation to the output shaft cone 32.

The most salient feature of the friction material used in the apparatus according to this invention resides in formation of a uniform and dense, more preferably in closest packing, solid lubricant layer 39 composed, in combination, of solid lubricant particles with relatively large sizes and solid lubricant particles with relatively small sizes, the layer being incorporated in a liquid or semi-solid lubricant layer 42 covering the cork friction surface as shown in FIG. 4. This can realize drastic improvement in the service life of the cork friction material. Such improvement is assumed attributable to the fact that the solid lubricant layer composed of the particles with different sizes can effectively fit into the ruggedness on the cork surface, is densified in structure and creates a strong "wedge" effect between the particles with the result that the particles are more strongly bonded to each other and become less likely to separate or get loose.

As for the combination of the solid lubricant particles used in this invention, it suffices for the purpose of this invention to use in combination the lubricant particles with relatively large sizes and those with relatively small sizes, but usually it is preferred to use the particles with an average particle size of 4 μm or greater in a proportion of 10–98% by volume and those with an average particle size of 2 μm or less in 90–2% by volume, a total being 100% by volume.

Examples of the solid lubricants usable in this invention are molybdenum bisulfide, graphite, tungsten bisulfide, boron nitride, organomolybdenum, graphite fluoride, metallic oxides, metallic iodides, silicon nitride, molybdenum selenide, molybdenum telluride and the like. At least one of these lubricants is the solid lubricant of the invention.

The liquid or semi-solid lubricant incorporating a layer of the solid lubricant particles, may be liquid lubricants such as mineral oils, synthetic oils, polyolefin oils, aliphatic diester oils, neopentylpolyol ester oils, polybutene oils, polyalkylene glycol oils, silicate ester oils, phosphate oils, fluorine oils, polyphenyl ether oils, alkylbenzene oils, dodecyldioctylsilane oils and the like, or semi-solid lubricants such as so-called grease obtained by adding a thickener to the liquid lubricants. Metallic soaps such as Li soap, Ca soap, Al soap, Ca complex soap, Li complex soap, Al complex soap and the like may be used as the thickener. As non-soap thickener, polyurea, sodium terephthalamate, fluorinated high polymers, dyes (copper phthalocyanine, indanthrene, etc.), bentonite, silica gel and the like, may be used. If necessary, the lubricant may be added with an antioxidant such as an amine compound, a phenolic compound or a sulfur compound and/or an anticorrosive agent such as a carboxylate or a sulfonate.

The content of said solid lubricant particles in the liquid or semi-solid lubricant layer is usually in the range of 20 to 80% by volume (based on the whole volume including the liquid or semi-solid lubricant).

The cork molding used in this invention can be obtained by pressure molding (if necessary under heating) a chipped or powdered cork into a desired shape with the aid of an adhesive which may be a thermosetting resin such as phenolic resin, melamine resin, urea resin, epoxy resin and the like. It is usually preferred that the cork density is within the range of 0.4 to 0.7 g/cm$^3$.

The studies by the present inventors confirmed that wear resistance of the friction material can be further improved by providing a liquid lubricant in the inside of the cork molding, that is, in the area inside of the friction surface in addition to surface covering by a liquid or semi-solid lubricant layer which includes the solid lubricant particle layer. Liquid lubricant (hereinafter referred to as "inner lubricant") is preferably one which has equal affinity for cork, more preferably a smaller affinity for cork than the liquid or semi-solid lubricant applied on the friction surface of the cork molding (said liquid or semi-solid lubricant being hereinafter referred to as "surface lubricant"). The inner lubricant may be selected from those cited above as examples of the surface lubricant.

Arranging the cited lubricants in the order of strength of affinity for cork by using a sign of inequality, they stand as follows:

polyglycol oils > polybutene oils > fluorine oils > neopentylpolyol ester oils > silicate ester oils > aliphatic diester oils > phosphate ester oils > alkylbenzene oils > mineral oils > didodecyldioctylsilane oils > polyolefin oils > polyphenyl ether oils.

In the above-mentioned order, although the polyphenyl ether oils have poorer affinity for cork than the polyolefin oils, upon thermal degradation the polyphenyl ether oils have greater affinity for cork than the polyolefin oils. Therefore, the polyphenyl ether oils can be used as surface lubricant practically when the polyolefin oils are used as inner lubricant.

From these lubricants, one may optionally select a combination of any two lubricants which are different in affinity for cork. As for the viscosity of the inner lubricant, it is most desirable that such viscosity is within the range of 3.5 to 80 mm$^2$/S (at 210° F.) for the reason of durability and damping performances of the cork friction material.

The longer service life attained by use of the combination of lubricants is ascribed to the fact that because the surface lubricant having a high affinity for cork adheres fastly to the cork surface (it also has an effect of fastening the solid lubricant to the cork surface), the surface lubricant won't be easily lost by sliding friction. The surface lubricant also acts to arrest excess seepage of the inner lubricant to the surface. Since the inner lubricant moderately seeps out into the surface lubricant because of its relatively low affinity for cork, it can supply the loss of the surface lubricant to allow maintenance of enough lubricity of the cork surface. It is considered that these effects combined together lead to realization of the longer life.

The inner lubricant may, if necessary, include an antioxidant or anticorrosive agent such as those mentioned above. Inclusion of the inner lubricant in the cork molding may be accomplished by pressure molding (if necessary, under heating) a mixture of cork powder (or chips) and an adhesive with said lubricant, or by impregnating the lubricant in the cork molding under normal or reduced pressure.

The "power controlling apparatus" provided with the cork friction material according to this invention include in addition to motors incorporating a brake and clutch system such as described above and shown in the drawings, anti-pitching devices for railway vehicle trucks, disc pads used in disc brakes for automobiles and other vehicles, hydroextraction tanks of washer-dryer devices, machine tools, stepless speed change devices of friction transmission type, and so on.

The present invention is described in further detail hereinbelow by way of the embodiments thereof. In the following Examples and Comparative Examples, the dynamic coefficient of friction and durability were evaluated by measuring the coefficient of friction and durability relating to the damping performance by a pin and disc type friction tester. The useful performance by use of a motor equipped with a clutch and brake system such as shown in FIG. 1 was also evaluated. The coefficient of friction was measured under the conditions of 2.05 Kg f/cm$^2$ face pressure and 0.9 m/S sliding speed. The durability was evaluated by measuring the running time till the surface lubricant had disappeared by subjecting the test piece to continuous sliding friction under the conditions of 0.5 Kg f/cm$^2$ face pressure, 12.87 m/S sliding speed and 100° C. disc surface temperature. The useful performance of a motor with a clutch and brake system (hereinafter referred to simply as motor) was evaluated by counting the number of running cycles till the surface lubricant had disappeared when the test piece was subjected to the running cycles, with one cycle of run consisting of speed reduction, stoppage and operation under a half-clutched condition allowing sliding motion, by simulating the typical use conditions of an electric-powered sewing machine.

EXAMPLE 1

There were prepared blends comprising 30% by volume of compositions prepared by dissolving under heating 1 part by weight of nichel dibutyldithiocarbamate (antioxidant) in 100 parts by weight of liquid lubricants shown in Table 1 and 70% by volume of a surface lubricant consisting of 20% by volume of graphite with an average particle size of 4.5 μm and 80% by volume of molybdenum bisulfide with an average particle size of 0.5 μm, and each of these blends was coated on the friction surface of a cork molding. The coefficient of friction and durability of each of the thus obtained specimens of cork friction material were measured under the above-specified conditions. The results are shown in Table 1.

TABLE 1

| Specimen | Lubricant | Dynamic coefficient of friction | Durability (hrs) |
|---|---|---|---|
| 1 | Mineral oil (420) | 0.48 | 52 |
| 2 | Aliphatic diester oil (13) | 0.42 | 60 |
| 3 | Neopentylpolyol ester oil (82) | 0.41 | 62 |
| 4 | Polyolefin oil (180) | 0.47 | 48 |
| 5 | Polybutene oil (210) | 0.47 | 78 |
| 6 | Polyglycol oil (220) | 0.48 | 85 |
| 7 | Silicate ester oil (13) | 0.48 | 70 |
| 8 | Phosphate ester oil (40) | 0.41 | 72 |
| 9 | Fluorine oil (250) | 0.43 | 67 |
| 10 | Polyphenyl ether oil (320) | 0.46 | 80 |
| Prior art product* | | 0.47 | 25 |

*Surface lubricant: mineral oil (viscosity, 9.8 mm$^2$/S at 210° F. (98.9° C.)) containing 45 vol % of graphite having an average particle size of 0.5 μm.
(Note) The figures in the parentheses in the column of "Lubricant" are viscosity (mm$^2$/S at 40° C.)

EXAMPLE 2

The same blends as used for Specimen Nos. 1 to 10 in Example 1 were each coated on the friction surface of a cork molding containing 10% by weight of polyolefin oil, and the performance of each of the thus obtained cork friction material specimens were determined in the same manner as in Example 1, obtaining the results shown in Table 2.

TABLE 2

| Specimen | Surface lubricant (Specimen No. in Table 1) | Dynamic coefficient of friction | Durability (hrs) | Useful performance (× 10$^4$ cycles) |
|---|---|---|---|---|
| 11 | 1 | 0.51 | 305 | 375 |
| 12 | 2 | 0.47 | 310 | 386 |
| 13 | 3 | 0.47 | 380 | 402 |
| 14 | 4 | 0.53 | 290 | 330 |
| 15 | 5 | 0.54 | 650 | 620 |
| 16 | 6 | 0.55 | 720 | 889 |
| 17 | 7 | 0.49 | 340 | 401 |
| 18 | 8 | 0.48 | 310 | 387 |
| 19 | 9 | 0.53 | 410 | 442 |
| 20 | 10 | 0.54 | 350 | 421 |
| Prior art product* | | 0.45 | 120 | 275 |

*Surface lubricant: mineral oil (viscosity, 9.8 mm$^2$/S at 210° F. (98.9° C.)) containing 45 vol % of graphite.
Inner lubricant: mineral oil (viscosity, 20.5 mm$^2$/S at 210° F. (98.9° C.)), content: about 20 vol %.

As seen from Table 2, each of the specimens of Example 2 is higher in coefficient of friction and more excellent in durability and useful performance than the prior art product.

EXAMPLE 3

There were prepared blends comprising 40% by volume of a composition obtained by dissolving under heating 1 part by weight of nickel dibutyldithiocarbamate (antioxidant) in 100 parts by weight of a polyglycol oil (polyalkylene glycol having a viscosity of 220 m$^2$/S at 40° C.) and 60% by volume of surface lubricants prepared by blending graphite with an average particle size of 0.5 μm and molybdenum bisulfide with an average particle size of 5.0 μm in the ratios by volume shown in Table 3, and each of these blends was coated on the friction surface of a cork molding in the same way as Example 2. The performances of each of the thus obtained specimens of cork friction material are shown in Table 4.

TABLE 3

| Solid lubricant | Specimens | | | | | | | |
|---|---|---|---|---|---|---|---|---|
| | 1 | 2 | 3 | 4 | 5 | 6 | 7 | 8 |
| Graphite | 2 | 5 | 10 | 20 | 40 | 60 | 80 | 90 |
| Molybdenum bisulfide | 98 | 95 | 90 | 80 | 60 | 40 | 20 | 10 |

TABLE 4

| Specimen | Dynamic coefficient of friction | Durability (hrs) | Useful performance in a motor (× 10$^4$ cycles) |
|---|---|---|---|
| 1 | 0.49 | 290 | 375 |
| 2 | 0.53 | 490 | 670 |
| 3 | 0.53 | 720 | 889 |
| 4 | 0.55 | 678 | 732 |
| 5 | 0.56 | 526 | 580 |
| 6 | 0.60 | 372 | 480 |
| 7 | 0.60 | 210 | 352 |
| 8 | 0.62 | 180 | 310 |

From the results shown in Table 4, it is noted that both durability and useful performance of the cork friction material vary depending on the mixing ratio of graphite and molybdenum bisulfide, but each specimen is superior to the previously shown prior art product in these performances.

EXAMPLE 4

Surface lubricants were prepared by blending, in the ratios shown in Table 5, a solid lubricant comprising a 2:3 (by volume) mixture of graphite with an average particle size of 10 μm and molybdenum bisulfide with an average particle size of 1 μm in the same lubricant composition (polyglycol oil+antioxidant) as used in Example 3, and each of these surface lubricants was coated on the friction surface of a cork molding. The performances of each of the thus obtained cork friction material specimens, as determined in the manner described above, are shown in Table 5.

TABLE 5

| Mixing ratio (vol %) | | Dynamic coefficient of friction | Durability (hrs) | Useful performance in a motor (× 10⁴ cycles) |
| --- | --- | --- | --- | --- |
| Polyglycol oil | Solid lubricant | | | |
| 15 | 85 | 0.57 | 180 | 250 |
| 20 | 80 | 0.54 | 720 | 889 |
| 30 | 70 | 0.54 | 728 | 891 |
| 40 | 60 | 0.52 | 605 | 790 |
| 60 | 40 | 0.54 | 570 | 770 |
| 80 | 20 | 0.55 | 350 | 437 |
| 85 | 15 | 0.58 | 130 | 198 |

EXAMPLE 5

Surface lubricants were prepared by blending total 60% by volume of a mixture of graphite with an average particle size of 1 μm and tungsten bisulfide with an average particle size of 4.5 μm, boron nitride with an average particle size of 5 μm, zinc iodide with an average particle size of 5 μm, lead oxide with an average particle size of 4 μm or graphite fluoride with an average particle size of 4 μm mixed in the ratios shown in Table 6 and 40% by volume of a composition prepared by dissolving under heating 1 part by weight of nickel dibutyldithiocarbamate (antioxidant) in a polyglycol oil (polyalkylene glycol oil), and each of these surface lubricants was coated on the friction surface of a cork molding. The performances of the resultantly obtained cork friction materials are shown in Table 6.

TABLE 6

| Mixing ratio (vol %) | | | | | | Dynamic coefficient of friction | Durability (hrs) |
| --- | --- | --- | --- | --- | --- | --- | --- |
| Graphite | Tungsten bisulfide | Boron nitride | Zinc iodide | Lead oxide | Graphite fluoride | | |
| 5 | 95 | | | | | 0.49 | 420 |
| 5 | | 95 | | | | 0.50 | 440 |
| 5 | | | 95 | | | 0.50 | 500 |
| 5 | | | | 95 | | 0.52 | 480 |
| 5 | | | | | 95 | 0.55 | 512 |
| 10 | 90 | | | | | 0.52 | 520 |
| 10 | | 90 | | | | 0.53 | 551 |
| 10 | | | 90 | | | 0.54 | 600 |
| 10 | | | | 90 | | 0.52 | 530 |
| 10 | | | | | 90 | 0.51 | 559 |
| 40 | 60 | | | | | 0.54 | 510 |
| 40 | | 60 | | | | 0.54 | 570 |
| 40 | | | 60 | | | 0.55 | 605 |
| 40 | | | | 60 | | 0.52 | 562 |
| 40 | | | | | 60 | 0.52 | 570 |
| 60 | 40 | | | | | 0.56 | 490 |
| 60 | | 40 | | | | 0.56 | 542 |
| 60 | | | 40 | | | 0.57 | 528 |
| 60 | | | | 40 | | 0.55 | 510 |
| 60 | | | | | 40 | 0.54 | 532 |

EXAMPLE 6

Surface lubricants were prepared by mixing 65% by volume of solid lubricants comprising 13 parts by volume of graphite having an average particle size of 0.5 μm and 52 parts by volume of molybdenum bisulfide having an average particle size of 5 μm with 35% by volume of each grease composition comprising 45 parts by weight of polyalkylene glycol, 5 parts by weight of thickeners shown in Table 7 and 1 part by weight of nickel dibutyldithiocarbamate (antioxidant), and these lubricant preparations were each coated on the friction surface of a cork molding containing 11% by weight of polyolefin oil as inner lubricant. The thus obtained cork friction materials had properties shown in Table 7.

TABLE 7

| Thickener | Dynamic coefficient of friction | Durability (hrs) | Useful performance in a motor (× 10⁴ cycles) |
| --- | --- | --- | --- |
| Lithium 12-hydroxystearate | 0.45 | 310 | 412 |
| Li complex | 0.49 | 350 | 450 |
| Bentonite | 0.55 | 730 | 892 |
| Copper phthalocyanine | 0.54 | 720 | 840 |
| Polyurea | 0.55 | 630 | 715 |

The foregoing results attest to a marked improvement in life of the power controlling apparatus according to the present invention.

What is claimed is:

1. In a power controlling apparatus comprising means for transferring energy by applying friction and using a friction material, the improvement comprising using as said friction material a molded cork, a friction surface of which has a lubricant layer comprising predetermined proportions of a solid lubricant having a larger average particle size and a solid lubricant having a smaller average particle size and filling vacant spaces between the larger-sized solid lubricant in dense form.

2. A power controlling apparatus according to claim 1, wherein the solid lubricant having a larger particle size has an average particle size of 4 μm or more and the solid lubricant having a smaller particle size has an average particle size of 2 μm or less.

3. In a power controlling apparatus comprising means for transferring energy by applying friction and using a friction material, the improvement comprising using as said friction material a molded cork, a friction surface of which has a lubricant layer comprising predetermined proportions of a solid lubricant having a larger average particle size and a solid lubricant having a smaller average particle size and filling vacant spaces between the larger-sized lubricant in dense form, said molded cork containing therein a liquid lubricant having a smaller or equal affinity for cork compared with the lubricant of said lubricant layer.

4. A power controlling apparatus according to claim 3, wherein the solid lubricant having a larger particle size has an average particle size of 4 μm or more, the solid lubricant having a smaller particle size has an average particle size of 2 μm or less, and wherein said lubricant layer further comprises a grease-like lubricant containing a mineral oil or synthetic oil and wherein the liquid lubricant contained in the molded cork is a mineral oil or synthetic oil.

5. A power controlling apparatus according to claim 1 or 3, which is an apparatus comprising a motor equipped with one or more clutches and brakes, lined with friction materials, as said means for transferring energy.

6. A power controlling apparatus according to claim 1 or 3, which is a disc brake.

7. A power controlling apparatus according to claim 1 or 3, which is a stepless speed change device.

8. A power controlling apparatus according to claim 1 or 3, wherein the solid lubricant having a larger particle size has an average particle size of at least about twice the average particle size of the solid lubricant having a smaller particle size.

9. A friction material for use in a power controlling apparatus comprising a molded cork, a friction surface of which has a lubricant layer comprising predetermined proportions of a solid lubricant having a larger average particle size and a solid lubricant having a smaller average particle size and filling vacant spaces between the larger-sized solid lubricant in dense form.

10. A friction material according to claim 9, wherein the solid lubricant having a larger particle size has an average particle size of 4 μm or more and the solid lubricant having a smaller particle size has an average particle size of 2 μm or less.

11. A friction material according to claim 10, wherein the solid lubricant having a larger particle size and the solid lubricant having a smaller particle size form a solid lubricant layer in closest packing on the friction surface of the molded cork.

12. A friction material according to claim 9 or 10, wherein the molded cork contains therein a liquid lubricant having a smaller or equal affinity for cork compared with the lubricant of said lubricant layer.

13. A friction material according to claim 12, wherein the liquid lubricant is introduced into the molded cork from the friction surface to the inner portion thereof.

14. A friction material according to claim 12, wherein the molded cork is produced by molding cork chips or powder using a thermosetting resin binder together with a liquid lubricant having a smaller or equal affinity for cork compared with the lubricant of said lubricant layer.

15. A friction material according to claim 12, wherein the liquid lubricant is a mineral oil, a polyolefin oil, an aliphatic diester oil, a neopentylpolyol ester oil, a polybutene oil, a polyalkylene glycol oil, a silicate ester oil, a phosphate oil, a fluorine oil, a polyphenyl ether oil, an alkylbenzene oil, or a didodecyldioctylsilane oil.

16. A friction material according to claim 9 or 10, wherein the solid lubricant is graphite, molybdenum disulfide, tungsten disulfide, boron nitride, zinc iodide, lead oxide, or graphite fluoride.

17. A friction material according to claim 9, wherein said lubricant layer further includes a liquid lubricant, wherein said liquid lubricant is a mineral oil, a polyolefin oil, an aliphatic diester oil, a neopentylpolyol ester oil, a polybutene oil, a polyalkylene gylcol oil, a silicate ester oil, a phosphate oil, a fluorine oil, a polyphenyl ether oil, an alkylbenzene oil, or a didodecyldioctylsilane oil.

18. A friction material according to claim 9, wherein the solid lubricant having a larger particle size has an average particle size of at least about twice the average particle size of the solid lubricant having a smaller particle size.

* * * * *